United States Patent
Rahman et al.

(10) Patent No.: US 7,592,765 B2
(45) Date of Patent: Sep. 22, 2009

(54) METHOD AND SYSTEM FOR CONTROLLING SYNCHRONOUS MOTOR DRIVE SYSTEMS

(75) Inventors: Khwaja M. Rahman, Troy, MI (US); Silva Hiti, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 393 days.

(21) Appl. No.: 11/552,580

(22) Filed: Oct. 25, 2006

(65) Prior Publication Data

US 2008/0100254 A1 May 1, 2008

(51) Int. Cl.
*H02P 21/00* (2006.01)
(52) U.S. Cl. .................................. 318/400.02; 318/432
(58) Field of Classification Search ............ 318/400.02, 318/727, 432, 434
See application file for complete search history.

(56) References Cited

U.S. PATENT DOCUMENTS

| | | | |
|---|---|---|---|
| 6,025,691 A * | 2/2000 | Kawabata et al. | 318/700 |
| 6,809,492 B2 * | 10/2004 | Harakawa et al. | 318/609 |
| 6,822,417 B2 * | 11/2004 | Kawaji et al. | 318/701 |
| 6,850,030 B2 * | 2/2005 | Kaku et al. | 318/727 |
| 7,262,536 B2 | 8/2007 | Rahman et al. | |
| 2004/0232862 A1 * | 11/2004 | Wogari et al. | 318/254 |
| 2008/0030155 A1 | 2/2008 | Patel et al. | |

* cited by examiner

*Primary Examiner*—Rina I Duda (57) ABSTRACT

Methods and systems are provided for controlling synchronous machines. The method comprises generating a d-axis current command and a q-axis current command, producing a modified current command from the q-axis current command, converting the d-axis current command to a first voltage command, converting the modified current command to a second voltage command, and supplying the first and second voltage commands to the synchronous machine. The modified current command limits a terminal voltage generated by the permanent magnet machine.

19 Claims, 4 Drawing Sheets

METHOD AND SYSTEM FOR CONTROLLING SYNCHRONOUS MOTOR DRIVE SYSTEMS

TECHNICAL FIELD

The present invention generally relates to controlling alternating current (AC) motors, and more particularly relates to systems and methods for controlling synchronous motors such as permanent magnet motors and synchronous reluctance motors.

BACKGROUND OF THE INVENTION

AC motors are used in a variety of applications, including vehicle applications, and AC induction motors are desirable for having a simple, rugged construction, easy maintenance, and cost-effective pricing. The AC motors used in vehicle applications are typically controlled via a voltage source inverter such that the motor phase currents are sinusoidal. Supplying a sinusoidally shaped input current to the AC motor typically produces torque without additional harmonics which can be a source of torque pulsations in the AC motors.

In vehicle applications, one design consideration is to maximize the utilization of the available DC bus voltage (e.g., provided by a battery). Maximization of the bus voltage utilization generally improves the high speed power and overall system efficiency. Some AC motors are permanent magnet (PM) machines. PM machines typically have high power density and high efficiency characteristics and are thus well-suited for vehicle propulsion applications. Electric machines have a current limitation, due to the current limits of the voltage source inverter, and a voltage limitation, due to the available DC bus voltage. At higher speeds, the PM machine, without voltage control, produces a machine flux, or a back EMF, that may increase beyond the DC bus voltage. For example, the phase voltage of a PM machine increases as the speed of the machine is increased. Above a predetermined speed, the phase voltage of the PM machine becomes greater than the bus voltage. To retain current control of the PM machine, the back EMF is reduced using field-weakening. In PM machines, the magnet flux cannot be inherently reduced, thus a demagnetizing current is typically applied to reduce the magnet or total flux of the PM machine.

To implement an efficiency-optimized control of the PM machine, the non-linear characteristics of the PM machine may be measured and used to develop a non-linear machine model. This model is used to determine efficiency-optimized control parameters, and these control parameters are typically added to the counter as look-up tables for efficiency-optimized control of the machine. The control parameters may also be determined within the voltage and current limits. During an ideal operation, a feed-forward control using these control parameters is generally sufficient to provide stable control of the PM machine under steady state conditions. To retain current control at high speeds, when the available voltage is limited, additional assistance may be needed especially during transient operations or in the event of a mismatch between the actual machine parameters and the measured parameters. A field weakening voltage loop is typically used to correct the errors between the model and the actual machine parameters for a stable machine operation.

Some strong magnet flux PM machines have a high no-load loss (e.g., a spin loss) and fault problems. A weak flux PM machine may be selected where the magnet flux is purposely kept low to avoid the problems associated the PM machines. Currently, d-axis current control techniques have been used to field weaken the back EMF in strong magnet flux PM machines. For example, a negative d-axis current may be applied to produce a demagnetizing flux component that reduces the magnet flux and the magnet back EMF. These d-axis current control techniques have limited success with weak flux PM machines due to the weak influence of the d-axis current on the machine voltage. For example, in the non-linear overmodulation region of operation, the weaker influence of the d-axis current on the machine flux may impair field weakened operation of the weak flux PM machine by increasing the total voltage magnitude instead of decreasing the same. D-axis current control can also fail in a strong flux machine that operates at high speed with a large demagnetizing current. Under a large demagnetizing current, d-axis flux may reverse sign (i.e., become negative) for a strong flux machine. The reversal of d-axis flux occurs in a weak flux machine at a much lower demagnetizing current and hence at a lower speed. As previously mentioned, the d-axis current has a weak influence on voltage in a weak flux machine. Moreover, due to the reversal of the sign of the d-axis flux, which may also be true for a strong flux machine, an attempt to lower voltage by applying more d-axis current generally increases the machine terminal voltage, thus destabilizing the demagnetizing control.

By overcoming machine voltage, current can be produced in the machine. In addition to the back EMF, the current regulator should overcome the resistive drop and the inductive drop. The inductive drop can be high, especially in the q-axis for a machine with reluctance (e.g., an interior PM machine or synchronous reluctance machine). By lowering machine terminal voltage, current control can be retained. For some high flux PM machines, lowering the PM back EMF at high speed by injecting demagnetizing current (e.g., negative d-axis current) indirectly lowers the machine terminal voltage due to a strong influence (e.g., PM field) on the voltage. However, for other machines, such as weak flux PM machines, synchronous reluctance machines, or even for some strong PM flux machines, controlling the d-axis current to reduce back EMF may not have a desirable effect on the machine terminal voltage.

Accordingly, it is desirable to provide a method for controlling permanent magnet or synchronous reluctance motor drive systems that reduces the machine terminal voltage while retaining current control particularly at high speeds. Additionally, it is desirable to provide a control system for PM or synchronous reluctance motor drive systems that reduces the machine terminal voltage while retaining current control particularly at high speeds. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Methods and system are provided for controlling a synchronous machine including, but not necessarily limited to, a permanent magnet machine or a synchronous reluctance machine. In one embodiment, a method for controlling a synchronous machine is provided. The synchronous machine generates a terminal voltage during operation and the method comprises the steps of generating a d-axis current command and a q-axis current command, producing a modified current command from the q-axis current command, converting the first current command to a first voltage command, converting the modified current command to a second voltage command, and supplying the first and second voltage commands to the synchronous machine. The modified current command limits the terminal voltage generated by the synchronous machine.

In another embodiment, a method for driving a permanent magnet machine comprises the steps of generating first and second current commands from a current command table, producing a modified current command from the second current command, comparing the first current command to a first measured current to produce a first adjusted voltage, comparing the modified current command to a second measured current to produce a second adjusted voltage, and supplying the first and second adjusted voltages to the permanent magnet machine. The modified current command limits terminal voltage of the permanent magnet machine during a non-linear operation of the permanent magnet machine.

In another embodiment, a system for controlling a synchronous motor via voltage commands comprises a first module having an input for receiving a first current command and a modified current command, a second module having an input for receiving a supply voltage and the voltage commands, a converter coupled to the first and second modules and configured to produce a feedback current, and a current limiter coupled to the comparator and configured to produce a limited current from the feedback current. The modified current command is derived from a sum of a second current command and the limited current. The first module is configured to determine a first flux linkage from the first current command and a second flux linkage from the modified current command and produce a modulation index command from the first and second flux linkages. The second module is configured to determine a modulation index from the voltage commands and the supply voltage. A modulation reference is produced based on the modulation index command. The feedback current matches the modulation index with the modulation reference.

DESCRIPTION OF THE DRAWINGS

The present invention will hereinafter be described in conjunction with the following drawings figures, wherein like numerals denote like elements.

DESCRIPTION OF AN EXEMPLARY EMBODIMENT

The following detailed description is merely illustrative in nature and is not intended to limit the invention or the application and uses of the invention. Furthermore, there is no intention to be bound by any expressed or implied theory presented in the preceding technical field, background, brief summary or the following detailed description.

The present invention is a system and method for controlling a synchronous machine, including but not necessarily limited to a permanent magnet (PM) machine and a synchronous reluctance machine. In general, the system comprises a current command source, a current regulator coupled to the current command source, and a field-weakening voltage control module coupled to the current regulator and the current command source. The current command source produces d- and q-axis current commands using a current command table that may be optimized for a predetermined control parameter (e.g., system efficiency). The field-weakening voltage control module produces a feedback current for use in modifying the q-axis current command to allow the current regulator to operate in a non-linear over-modulation region without the loss of current regulation. The current regulator converts the current commands, including the modified q-axis current command, and supplies duty cycles to a voltage source inverter which in turn applies the appropriate voltage (e.g., three-phase voltages) to the PM machine to produce the commanded current for the PM machine. The system and method of the present invention may also be applied to a synchronous reluctance machine.

Figure 1:
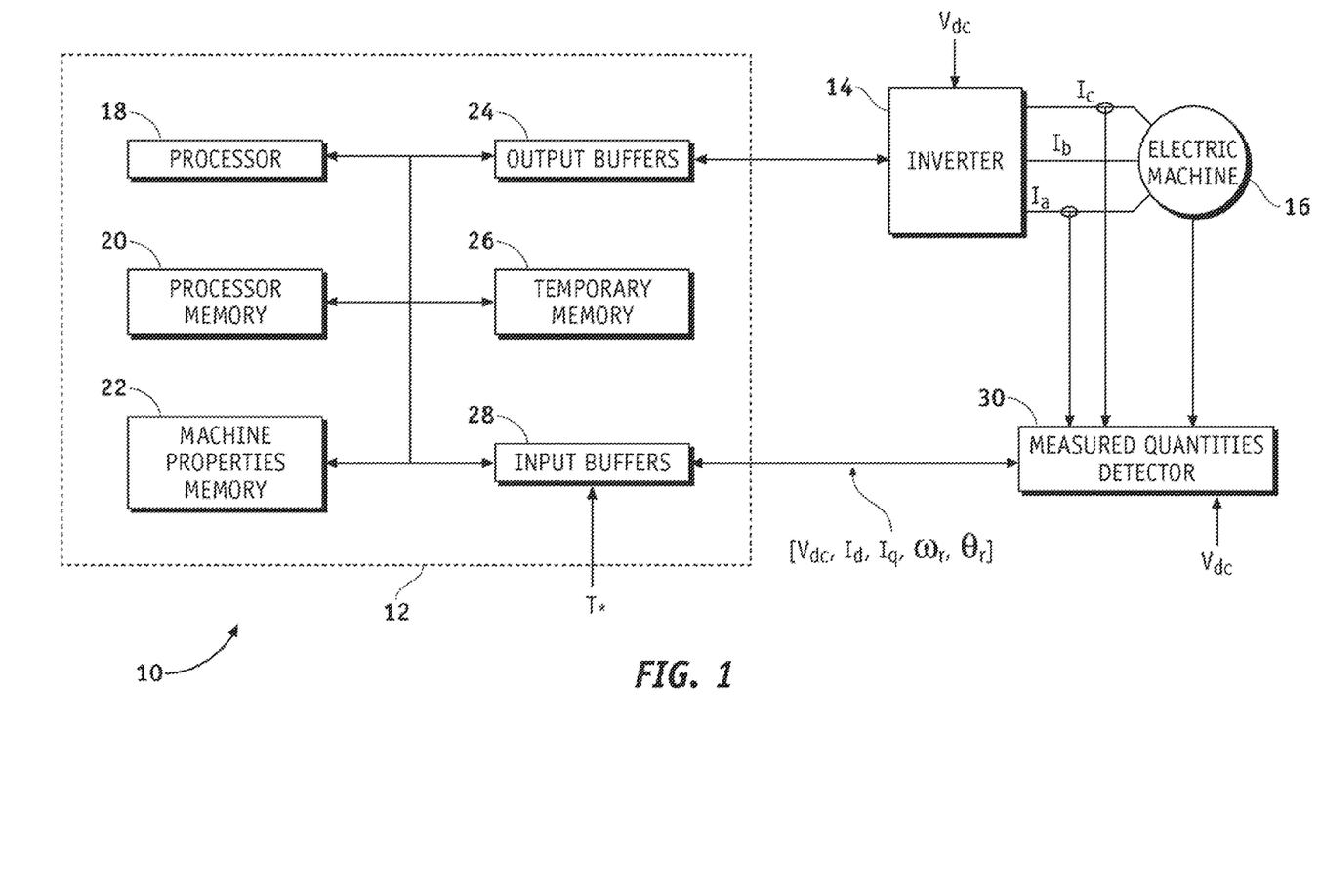
FIG. 1 is a block diagram of a drive system including a permanent magnet machine in accordance with an exemplary embodiment of the present invention.

Referring to FIG. 1, a drive system 10 having a PM machine 16 is shown in accordance with one embodiment of the present invention. The drive system 10 comprises a controller 12, a voltage source inverter 14 coupled to the controller 12, the PM machine 16 coupled to the voltage source inverter 14, and a detector 30 having a first input coupled to the voltage source inverter 14, a second input coupled to the PM machine 16, and an output coupled to the controller 12 that supplies measured quantities of a variety of system outputs to the controller. The controller 12 produces duty cycle commands from the measured quantities and supplies the duty cycle commands to the voltage source inverter 14. The voltage source inverter 14 produces three-phase voltages (e.g., $V_a$, $V_b$, $V_c$) from a supply potential (e.g., a battery potential or DC bus voltage ($V_{dc}$)) using the duty cycle commands and drives the PM machine 16 with the three-phase voltages. The detector 30 acquires the measured quantities including, but not necessarily limited to, the supply voltage ($V_{dc}$), measured phase currents (e.g., $I_a$, $I_b$, and $I_c$, although measurement of two phase currents may be enough for a Y connected machine without a neutral), a rotor speed ($\omega_r$), and a rotor phase angle ($\theta_r$).

The voltage source inverter 14 converts the supply voltage ($V_{dc}$) into an AC voltage which is used to drive the PM machine 16. The voltage source inverter 14 can also vary the amount of voltage applied to the PM machine 16, thus allowing the controller 12 to control the PM machine current. The amount of voltage the voltage source inverter 14 applies to the machine 16, thus allowing the controller 12 to control the PM machine current. The amount of voltage the voltage source inverter 14 applies to the PM machine is indicated by a modulation index. For example, a modulation index of zero indicates that the applied voltage is zero, and a modulation index of one indicates that the voltage source inverter 14 has applied the full battery voltage to the PM machine (e.g., via a six-step operation). Between these modulation index values, the voltage source inverter 14 can vary the voltage, such as by pulse width modulation (PWM). Up to a modulation index of about 0.9069 (e.g., about 90.6% of the bus voltage), the voltage source inverter 14 linearly controls the PM machine voltage. Beyond the modulation index of about 0.9069, the voltage source inverter 14 operates in an over-modulation region where the control of the voltage is non-linear.

Using the measured quantities, the controller 12 produces the duty cycle commands. The controller 12 comprises a processor 18, a processor memory 20, a machine properties memory 22, an input buffer 28, an output butter 24, and a temporary memory 26 coupled to one another. The measured quantities are received by the input buffer 28 and may be stored in the machine properties memory, processor memory, or temporary memory 26 during operation of the controller 12. In an exemplary embodiment, the controller 12 executes one or more programs (e.g., to optimize current commands for a predetermined control parameter, to account for over-modulation region operation of the permanent magnet machine, and the like) to determine any precursor elements (e.g., modified current commands, voltage commands, and the like) used in determining the duty cycle commands.

Figure 2:
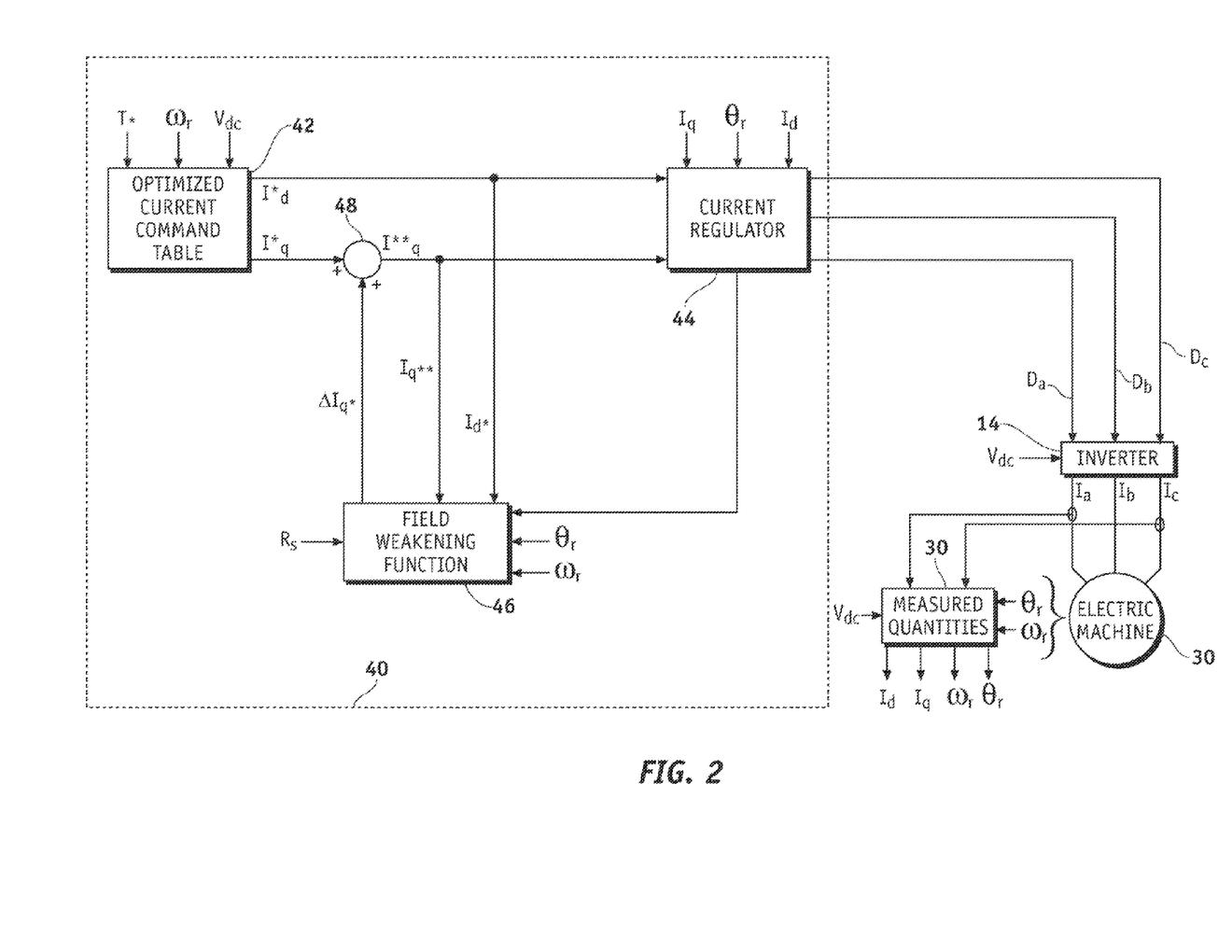
FIG. 2 is a block diagram illustrating a current control system of the drive system shown in FIG. 1.

Referring to FIGS. 1 and 2, FIG. 2 is a block diagram illustrating a current control system 40 of the drive system 10 in accordance with an exemplary embodiment of the present invention. The current control system 40 is implemented by the controller 12. One or more of the components of the current control system 40 may be embodied in software or firmware, hardware, such as an application specific integrated circuit (ASIC), an electronic circuit, a processor (shared, dedicated, or group) and memory that execute one or more software or firmware programs, a combinational logic circuit, and/or other suitable components or combinations thereof.

Generally, the current control system 40 comprises a current command table 42, a current command summing block 48, a field weakening module 46, and a current regulator 44. A first output of the current command table 42 is coupled to a first input of the summing block 48. The field weakening module 46 has a first input coupled to an output of the summing block 48, a second input coupled to a second output of the current command table 42, and an output coupled to a second input of the summing block 48. The current regulator has a first input coupled to the first output of the current command table 42, a second input coupled to the output of the summing block 48, a first output coupled to the voltage source inverter 14, and a second output coupled to the field weakening module 46. Optimized current commands (e.g., a d-axis current command ($I^*_d$) and a q-axis current command ($I^*_q$)) are produced by the current command table 42, and the field weakening module 46 produces a feedback current ($\Delta I^*_q$) to modify the q-axis current command (if necessary), via the summing block 48. The resulting modified q-axis current command ($I^{**}_q$), in combination with the d-axis current command ($I^*_d$), are supplied to the current regulator 44 and allow the current regulator 44 to operate in a non-linear over-modulation region when needed without the loss of current regulation stability even during transient operations.

The current command table 42 may be stored (e.g., as a look-up table) in the processor memory 20 and is preferably optimized for a predetermined control parameter (e.g., system efficiency). The current command table 42 may be derived from any number of models for optimizing a desired control parameter and also utilize the voltage and current limits of the PM machine 16 to apply an appropriate amount of d- and q-axis currents to the PM machine to produce the desired torque with high efficiency and maintain current regulation stability by controlling the machine terminal voltage. For a particular torque command (T*), rotor speed ($\omega_r$), and the supply potential ($V_{dc}$), such as collected by the detector 30 and supplied to the controller 12, an optimized d-axis current command ($I^*_d$) and q-axis current command ($I^*_q$) are determined from the current command table 42.

To produce the feedback current ($\Delta I^*_q$), the field weakening module 46 samples the current command (e.g., the optimized d-axis current command ($I^*_d$) and the modified q-axis current command ($I^{**}_q$)) supplied to the current regulator 44. Additionally, the field weakening module 46 samples synchronous frame voltage commands produced in the current regulator 44. From the sampled current commands, the sampled synchronous frame voltage commands, the measured rotor speed ($\omega_r$), the measured rotor phrase angle ($\theta_r$), and a machine per phase resistance ($R_s$) of the PM machine 16, the field weakening module 46 determines the feedback current ($\Delta I^*_q$). Under ideal operation, the feedback current ($\Delta I^*_q$) would be zero and no modification to the q-axis current command $I^*_q$ would be necessary since the control table 42 is generated while working within the inverter voltage and current limits. However, in the non-ideal case, the feedback current $\Delta I^*_q$ corrects errors between the actual machine parameters and the modeled machine parameters thereby allowing stable current control at all speeds and machine torque level.

Figure 3:
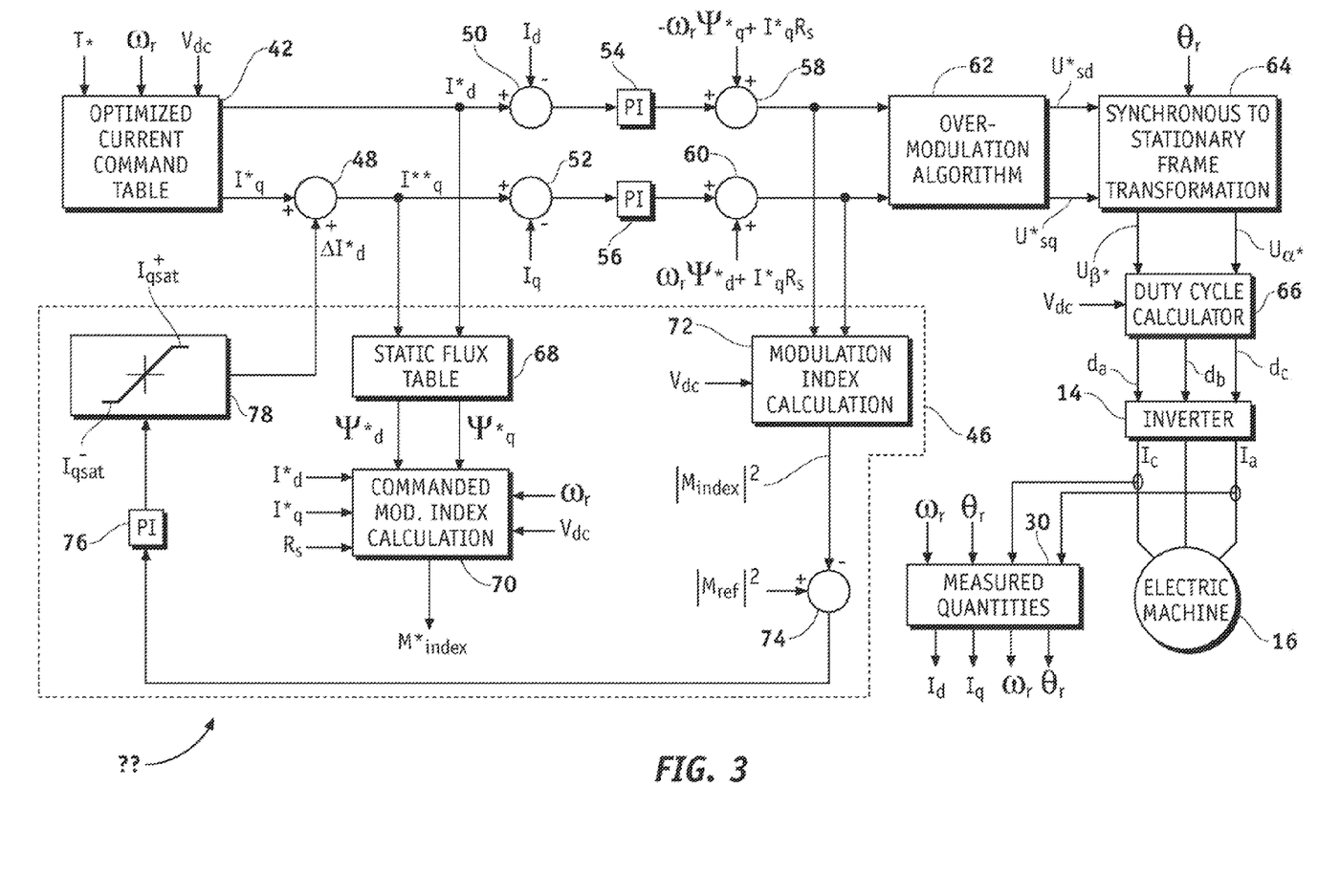
FIG. 3 is a block diagram illustrating the current control system shown in FIG. 2 in greater detail.

Referring to FIGS. 2 and 3, FIG. 3 is a block diagram illustrating the current control system 40 in greater detail. In this exemplary embodiment, the current regulator 44 comprises comparators 50 and 52, proportional-integral (PI) controllers 54 and 56 coupled to the comparators 50 and 52, respectively, summing blocks 58 and 60 coupled to the PI controllers 54 and 56, respectively, an over-modulation module 62 coupled to the summing blocks 58 and 60, a transformation module 64 coupled to the over-modulation module 62, and a duty cycle module 66 coupled to the transformation module 64. The comparator 50 receives the d-axis current command ($I^*_d$) from the command table 42 and compares the d-axis current command ($I^*_d$) with a measured d-axis current ($I_d$) to produce a d-axis current error. The comparator 52 receives the modified q-axis current command ($I^{}_q$) and compares the q-axis modified current command ($I^{}_q$) with a measured q-axis current ($I_q$) to produce a q-axis current error. The PI controllers 54 and 56 convert the current errors (e.g., d- and q-axis current errors, respectively) to synchronous frame voltage commands (e.g., d- and q-axis synchronous frame voltage commands respectively), and the summing blocks 58 and 60 add a corresponding feed-forward term to each of the synchronous frame voltage commands. In an exemplary embodiment, the feed-forward term is the sum of the speed voltage and a resistive drop across the stator and is added to the output of the PI controllers 54 and 56 to improve the transient performance of the drive system 10. For example, the summing block 58 adds a feed-forward term ($-\omega_r\psi^*_q+I^*_dR_s$) to the d-axis synchronous frame voltage command, and the comparator 60 adds a feed-forward term ($\omega_r\omega^*_d+I^*_qR_s$) to the q-axis synchronous frame voltage command, where $\psi^*_q$ is a q-axis flux linkage command and $\psi^*_d$ is a d-axis flux linkage command. An anti-windup current regulator may also be implemented to minimize current overshoot.

The outputs of the summing blocks 58 are supplied to the over-modulation module 62, and the over-modulation module 62 implements a control algorithm that accounts for the non-linear control of the synchronous frame voltage commands. The transformation module 64 converts the synchronous frame voltage commands ($U^*_{sd}$ and $U^*_{sq}$) received from the over-modulation module 62 to stationary frame voltage commands ($U^*_\alpha$ and $U^*_\beta$) using the measured rotor phase position ($\theta_r$). The duty cycle module 66 receives the stationary frame voltage commands ($U^*_\alpha$ and $U^*_\beta$) from the transformation module 64 and the supply voltage ($V_{dc}$) (e.g., the measured dc bus voltage). Using PWM, the width or duty cycle of the signals from the voltage source inverter 14 establishes the voltage magnitude applied to the PM machine 16, and the duty cycle module 66 determines these duty cycles from the stationary frame voltage commands.

The appropriate voltage magnitude produced by the voltage source inverter 14 produces the commanded d- and the q-axis current commands in the machine phases, and the field weakening module 46 modifies the q-axis current commands to control the machine terminal voltage. In this exemplary embodiment, the field weakening module 46 comprises a static flux table 68, a commanded modulation index module 70 calculated using the commanded d- and q-axis flux linkages from the static flux table 68, an actual modulation index module 72 calculated using the exact voltages to be applied (in the next PWM cycle) to the machine terminal, a comparator 74 coupled to the modulation index module 72, a PI controller 76 coupled to the comparator 74, and a current limiter 78 coupled to the PI controller 76. The outputs of the summing blocks 58 and 60 (e.g., synchronous frame voltage commands with the added feed-forward terms) are sampled by the modulation index module 72, and a modulation index ($M_{index}$) is calculated using the supply voltage ($V_{dc}$). The d- and q-axis flux linkage commands ($\psi^*_d$ and $\psi^*_q$) are determined using the static flux table 68, the sampled d-axis current command ($I^*_d$), and modified q-axis current command ($I^{}_q$) and supplied to the modulation index module 70. The modulation index module 70** determines a modulation index command ($M^*_{index}$) with the d- and q-axis flux linkage commands ($\psi^*_d$ and $\psi^*_q$), the d-axis current command ($I^*_d$), the modified q-axis current command ($I^{}_q$), machine per phase resistance ($R_s$) of the PM machine 16**, the supply potential ($V_{dc}$), and the measured rotor speed ($\omega_r$). For example, the modulation index command ($M^*_{index}$) is determined by the following equations:

$$V^*_d = I^*_d R_s - w_s \psi^*_q$$
$$V^*_q = I^*_q R_s + w_s \psi^*_d$$
$$V^*_s = \sqrt{V^{*2}_d + V^{*2}_q}$$
$$M^*_{index} = \frac{V^*_s}{\frac{2}{\pi} V_{ds}}.$$

Using the modulation index command ($M^*_{index}$), the controller 12 establishes a value for a modulation reference ($M_{ref}$). In the event the modulation index command ($M^*_{index}$) is less than a predetermined lower modulation index limit ($M_{lower}$) or greater than a predetermined upper modulation index limit ($M_{upper}$), the modulation reference ($M_{ref}$) is assigned the upper modulation index limit ($M_{upper}$). The lower modulation index limit ($M_{lower}$) and upper modulation index limit ($M_{upper}$) establish the limits of operation in the overmodulation region of the PM machine 16. In an exemplary embodiment, the upper modulation index limit ($M_{upper}$) is set to about ninety-five (95%) of the six-step operation value to provide a margin to generally account for transient operation and maintain current stability. In the event the modulation index command ($M^*_{index}$) is not less than the lower modulation index limit ($M_{low}$) and not greater than the upper modulation index limit ($M_{upper}$), the modulation reference ($M_{ref}$) is assigned the modulation index command ($M^*_{index}$). When the modulation index command ($M^*_{index}$) is less than the lower modulation index limit ($M_{lower}$), the voltage loop is not active. When the modulation index command ($M^*_{index}$) is greater than the lower modulation index limit ($M_{low}$) and less than the upper modulation index limit ($M_{upper}$), the voltage loop is active. When the modulation index command ($M^*_{index}$) is greater than the upper modulation index limit ($M_{upper}$), the voltage loop is active.

Additionally, the controller 12 establishes a positive saturation limit ($I^{pos}_{qsat}$) and a negative saturation limit ($I^{neg}_{qsat}$) for the current limiter 78 using the modulation index command ($M^*_{index}$). In the event the modulation index command ($M^*_{index}$) is greater than the lower modulation index limit ($M_{low}$), the positive saturation limit ($I^{pos}_{qsat}$) is assigned $K_1 \times I^*_q$ and the negative saturation limit ($I^{neg}_{qsat}$) is assigned $-K_2 \times I^*_q$, where $K_1$ and $K_2$ are a predetermined constants between zero and one. In the event the modulation index command ($M^*_{index}$) is less than or equal to the lower modulation index limit ($M_{low}$), the positive saturation limit ($I^{pos}_{qsat}$) is assigned zero and the negative saturation limit ($I^{neg}_{qsat}$) is assigned $-K_2 \times I^*_q$. The setting of the limits in the current limiter 78 along with the selection of $M_{ref}$ disables the voltage loop when $M^*_{index}$ is less than $M_{low}$. In one exemplary embodiment, $K_1 \leq 0.2$ and $K_2 \leq 0.4$.

The comparator 74 produces a difference between the square of the absolute value of the modulation reference ($M_{ref}$) and the square of the absolute value of the modulation index ($M_{index}$), the difference between the commanded and the actual (e.g., applied to the machine) modulation index squared. The PI controller 76 produces the appropriate q-axis current feedback to match the modulation index ($M_{index}$) with the modulation reference ($M_{ref}$). The current limiter 78 establishes the upper and lower limits (e.g., the positive saturation limit ($I^{pos}_{qsat}$) and the negative saturation limit ($I^{neg}_{qsat}$)) for the feedback current ($\Delta I^*_q$). Using the field weakening module 46 in a feedback loop configuration accounts for variations between the machine model used to determine the optimal control parameters and the actual machine operation characteristics.

Figure 4:
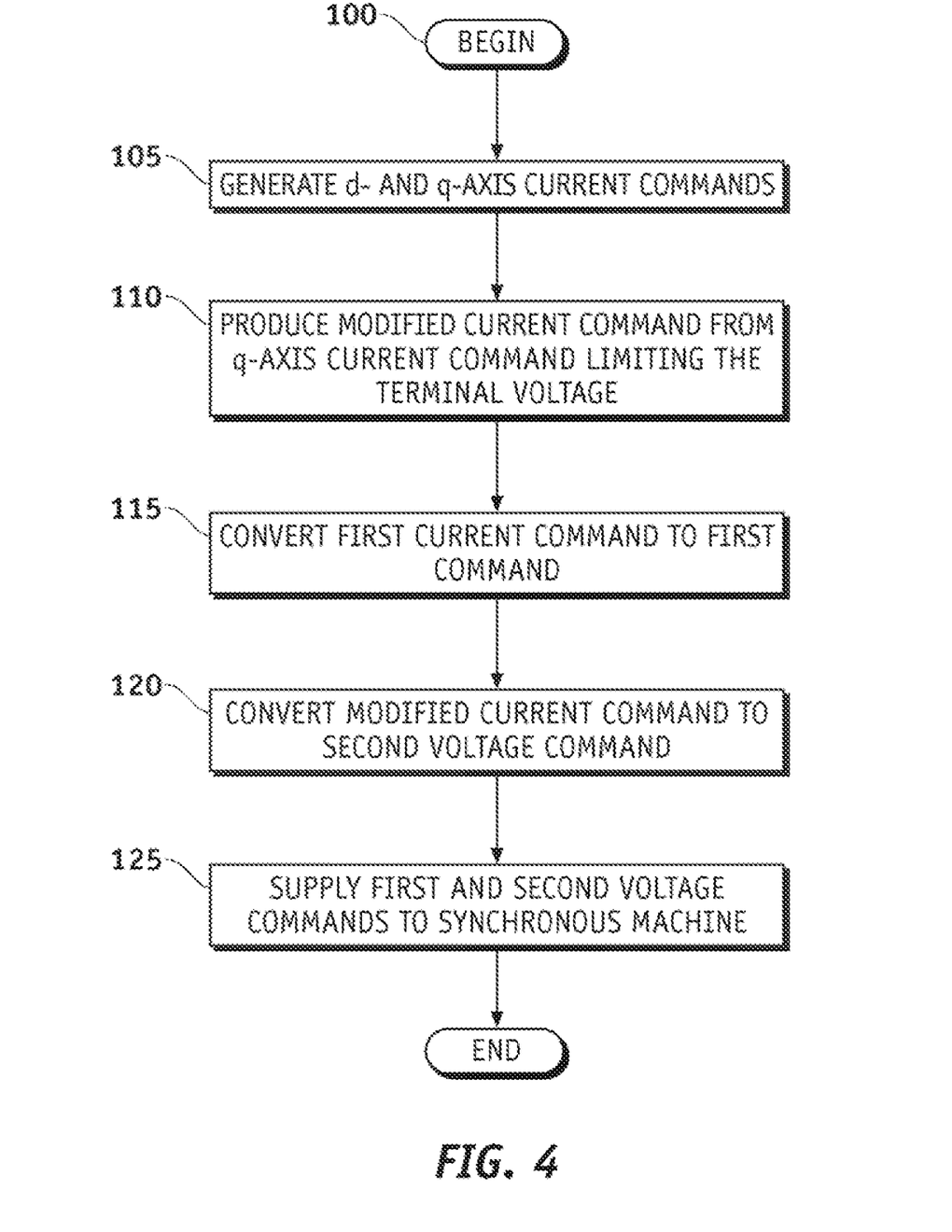
FIG. 4 is a flow diagram of a method for controlling a permanent magnet machine in accordance with an exemplary embodiment of the present invention.

FIG. 4 is a flow diagram of a method 100 for controlling a synchronous machine, such as a permanent magnet machine, a synchronous reluctance machine, and the like, in accordance with an exemplary embodiment of the present invention. A d-axis current command and a q-axis current command are generated at step 105. The d- and q-axis current command are preferably generated using an optimized current command table based on the torque command, the rotor speed ($\omega_r$) of the synchronous machine, and a supply voltage ($V_{dc}$). A modified current command is produced from the q-axis current command that limits the machine terminal voltage generated by the synchronous machine through field weakening at step 110. In one embodiment, a modulation index is derived from the first and second modified voltage commands, a reference modulation index is determined from the d-axis flux linkage ($\psi^*_d$) and the q-axis flux linkage ($\psi^*_q$), an error is determined by comparing the modulation index with a reference modulation index, the error is converted to a first value, the first value is limited between a positive value and a negative value to produce a second value, and the second value is added to the second current command to produce the modified current command. To determine the error, a modulation index command is produced from the d-axis current command, the q-axis current command, the d-axis flux linkage ($\psi^*_d$), the q-axis flux linkage ($\psi^*_q$), the machine per phase resistance ($R_s$) of the synchronous machine, a DC supply voltage, and the rotor speed ($\omega_r$) of the synchronous machine. The reference modulation index is assigned to the modulation index command in the event the modulation index command is not less than a lower limit and the modulation index command is not greater than an upper limit. The reference modulation index is assigned to the upper limit in the even the modulation index command is less than a lower limit or when the modulation index command greater than an upper limit. To limit the first value, the maximum value is assigned $K_1 \times I^*_q$ and the minimum value is assigned $-K_2 \times I^*_q$ in the event the modulation index command is greater than a predetermined lower limit, the maximum value is assigned to zero and the minimum value is assigned to $-K_2 \times I^*_q$ when the modulation index command is not greater than the lower limit.

The first current command is converted to a first voltage command at step 115. The modified current command is converted to a second voltage command at step 120. The first and second voltage commands are supplied to the synchronous machine (e.g., via a voltage source inverter) at step 125.

In another embodiment, a first modified voltage command is produced from a sum of the first voltage command and a feed-forward term $(-\omega_r \psi^*_q + I^*_d R_s)$, a second modified voltage command is produced from a sum of the second voltage command and a feed-forward term $(\omega_r \psi^*_d + I^*_q R_s)$. the d-axis flux linkage $(\psi^*_d)$ is derived from the d-axis current command, and q-axis flux linkage $(\psi^*_q)$ from the q-axis current command.

In another embodiment, a first synchronous command is produced from the first adjusted voltage, a second synchronous command is produced from the second adjusted voltage, the first and second synchronous commands are converted to first and second stationary commands, first, second, and third duty cycles are determined from the first and second stationary commands, and the first, second, and third duty cycles are supplied to a voltage source inverter. The voltage source inverter controls the synchronous machine.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for controlling a synchronous machine, the synchronous machine generating a terminal voltage during an operation thereof, the method comprising the steps of:
    generating a d-axis current command and a q-axis current command;
    producing a modified current command from the q-axis current command, the modified current command limiting the terminal voltage generated by the synchronous machine;
    converting the d-axis current command to a first voltage command;
    converting the modified current command to a second voltage command;
    producing a first modified voltage command from a sum of the first voltage command and $-\omega_r \psi^*_q + I^*_d R_s$;
    producing a second modified voltage command from a sum of the second voltage command and $\omega_r \psi^*_d + I^*_q R_s$;
    wherein $\omega_r$ is a rotor speed of the synchronous machine, $\psi^*_d$ is a d-axis flux linkage, $\psi^*_q$ is a q-axis flux linkage, $I^*_d$ is the first current command, $I^*_q$ is the second current command, and $R_s$ is a machine per phase resistance of the synchronous machine; and
    supplying the first and second modified voltage commands to the synchronous machine.

2. A method according to claim 1, further comprising:
    determining the d-axis flux linkage $(\psi^*_d)$ from the d-axis current command; and
    determining the q-axis flux linkage $(\psi^*_q)$ from the q-axis current command.

3. A method according to claim 1, wherein said step of producing a modified current command comprises:
    deriving a modulation index from the first and second modified voltage commands;
    determining a reference modulation index from the d-axis flux linkage $(\psi^*_d)$ and the q-axis flux linkage $(\psi^*_q)$;
    determining an error by comparing the modulation index with a reference modulation index;
    converting the error to a first value;
    limiting the first value between a positive value and a negative value to produce a second value; and
    adding the second value to the second current command to produce the modified current command.

4. A method according to claim 3, wherein said step of determining an error comprises:
    producing a modulation index command from the d-axis current command, the q-axis current command, the d-axis flux linkage $(\psi^*_d)$, the q-axis flux linkage $(\psi^*_q)$, the machine per phase resistance $(R_s)$ of the synchronous machine, a DC supply voltage, and the rotor speed $(\omega_r)$ of the synchronous machine;
    assigning the reference modulation index to the modulation index command when the modulation index command is not less than a lower limit and when the modulation index command is not greater than an upper limit; and
    assigning the reference modulation index to the upper limit when the modulation index command is less than a lower limit or when the modulation index command is greater than an upper limit.

5. A method according to claim 3, wherein said step of limiting the first value comprises:
    assigning the maximum value to $K_1 \times I^*_q$ and the minimum value to $-K_2 \times I^*_q$ when the modulation index command is greater than a predetermined lower limit;
    assigning the maximum value to zero and the minimum value to $-K_2 \times I^*_q$ when the modulation index command is not greater than the lower limit;
    wherein $K_1$ is a first predetermined constant between 0 and 1, $K_2$ is a second predetermined constant between 0 and 1, and $I^*_q$ is the q-axis current command.

6. A method for driving a permanent magnet machine, the method comprising the steps of:
    generating first and second current commands from a current command table;
    producing a modified current command from the second current command, the modified current command limiting a terminal voltage of the permanent magnet machine during a non-linear operation of the permanent magnet machine;
    comparing the first current command to a first measured current to produce a first adjusted current;
    comparing the modified current command to a second measured current to produce a second adjusted current; and
    supplying the first and second adjusted current to the permanent magnet machine.

7. A method according to claim 6, wherein said generating step comprises generating a d-axis current command and a q-axis current command from a torque command, a rotor speed of the permanent magnet machine, and a supply voltage.

8. A method according to claim 6, further comprising:
    converting the first adjusted current to a first voltage command; and
    converting the second adjusted current to a second voltage command;
    adding $-\omega_r \psi^*_q + I^*_d R_s$ to the first voltage command to produce a first adjusted voltage; and adding $\omega_r \psi^*_d + I^*_q R_s$ to the second voltage command to produce a second adjusted voltage;

wherein $\omega_r$ is a rotor speed of the permanent magnet machine, $\psi^*_d$ is a d-axis flux linkage, $\psi^*_q$ is a q-axis flux linkage, $I^*_d$ is the first current command, $I^*_q$ is the second current command, and $R_s$ is a machine per phase resistance of the permanent magnet machine.

9. A method according to claim 8, further comprising the steps of:
producing a first synchronous command from the first adjusted voltage;
producing a second synchronous command from the second adjusted voltage;
converting the first and second synchronous commands to first and second stationary commands;
determining first, second, and third duty cycles from the first and second stationary commands; and
supplying the first, second, and third duty cycles to a voltage source inverter, the voltage source inverter controlling the permanent magnet machine.

10. A method according to claim 8, wherein said step of producing a modified current command comprises:
deriving a modulation index from the first and second adjusted voltages;
determining an error by comparing the modulation index with a reference modulation index;
converting the error to a first value;
limiting the first value to produce a second value; and
adding the second value to the second current command to produce the modified current command.

11. A method according to claim 10, wherein said step of determining an error comprises:
determining a modulation index command from the first current command and the modified current command;
assigning the reference modulation index to the modulation index command when the modulation index command is not less than a lower limit and when the modulation index command is not greater than an upper limit;
assigning the reference modulation index to the upper limit when the modulation index command less than a lower limit; and
assigning the reference modulation index to the upper limit when the modulation index command greater than an upper limit.

12. A method according to claim 11, wherein said step of limiting comprises limiting the first value between a first limit and a second limit, wherein the first limit is $K_1 \times I^*_q$ and the second limit is $-K_2 \times I^*_q$ when the modulation index command is greater than the lower limit, wherein the first limit is zero and the second limit is $-K_2 \times I^*_q$ when the modulation index command is not greater than the lower limit, and wherein $K_1$ is a first predetermined constant between 0 and 1, $K_2$ is a second predetermined constant between 0 and 1, and $I^*_q$ is the second current command.

13. A method according to claim 12, wherein $K_1 \leqq 0.2$ and $K_2 \leqq 0.4$.

14. A method according to claim 6, further comprising:
determining first and second flux linkages from the first current command, the modified current command, and a static flux table; and
determining a modulation index command from the first and second flux linkages, the first and second current commands, a machine per phase resistance of the permanent magnet machine, a supply voltage, and a rotor speed of the permanent magnet machine.

15. A system for controlling a synchronous motor via voltage commands, the system comprising:
a first module having an input for receiving a first current command and a modified current command, said modified current command derived from a sum of a second current command and a limited current, said first module configured to:
determine a first flux linkage from said first current commands and a second flux linkage from said modified current command; and
produce a modulation index command from said first and second flux linkages;
a second module having an input for receiving a supply voltage and the voltage commands, said second module configured to:
determining a modulation index from the voltage commands and the supply voltage; and
produce a modulation reference based on said modulation index command;
a converter coupled to said first and second modules and configured to produce a feedback current, said feedback current matching said modulation index with said modulation reference; and
a current limiter coupled to said comparator and configured to produce said limited current from said feedback current.

16. A system according to claim 15, wherein the synchronous motor has a rotor speed, and wherein the system further comprises:
a third module having an output coupled to said first modulation index module, said third module configured to produce said first and second current commands from a torque command, said rotor speed of the permanent magnet motor, and said supply voltage.

17. A system according to claim 15, wherein said converter comprises:
a comparator for producing a difference between said modulation index and said modulation reference; and
a proportional-integral (PI) controller having an input coupled to said comparator and an output coupled to said current limiter, and PI controller configured to produce said feedback current from said difference.

18. A system according to claim 15, wherein said second module is further configured to:
assign said modulation reference to said modulation index command when said modulation index command is not less than a predetermined lower limit and when said modulation index command is not greater than a predetermined upper limit;
assign said modulation reference to said predetermined upper limit when said modulation index command is less than said predetermined lower limit; and
assign said modulation reference to said predetermined upper limit when said modulation index command is greater than said predetermined upper limit.

19. A system according to claim 15, wherein said current limiter is further configured to:
limit said feedback current between $K_1 \times I^*_q$ and $-K_2 \times I^*_q$ when said modulation index command is greater than a predetermined lower limit;
limit said feedback current between 0 and $-K_2 \times I^*_q$ when said modulation index command is less or equal to said predetermined lower limit;
wherein $K_1$ is a first predetermined constant between 0 and 1, $K_2$ is a second predetermined constant between 0 and 1, and $I^*_q$ is said second current command.

* * * * *